(No Model.)

H. G. OLDS.
CHURN.

No. 501,806. Patented July 18, 1893.

Witnesses
C. W. Miles
L. Simmons

Inventor
Henry G. Olds
By Wood & Boyd
Attorneys

UNITED STATES PATENT OFFICE.

HENRY G. OLDS, OF FORT WAYNE, INDIANA.

CHURN.

SPECIFICATION forming part of Letters Patent No. 501,806, dated July 18, 1893.

Application filed April 29, 1893. Serial No. 472,383. (No model.)

*To all whom it may concern:*

Be it known that I, HENRY G. OLDS, a citizen of the United States, residing at Fort Wayne, in the county of Allen and State of Indiana, have invented certain new and useful Improvements in Churns, of which the following is a specification.

This invention has for its object to provide a new and improved churn, wherein an oscillating box is provided with compensating springs.

The invention consists in the features of construction and the combination or arrangement of parts hereinafter described and claimed, reference being made to the accompanying drawings, in which—

Figure 1:
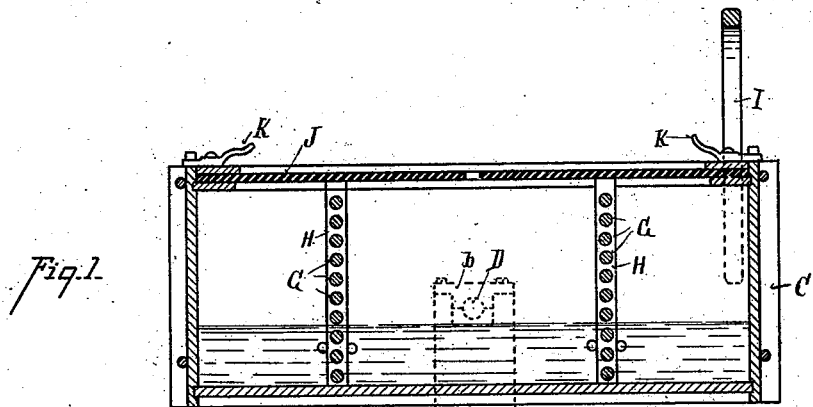
Figure 2:
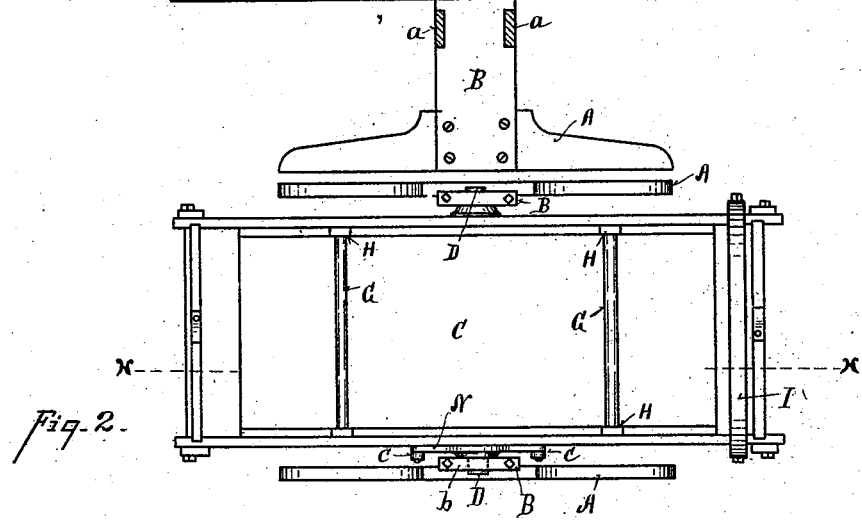
Figure 3:
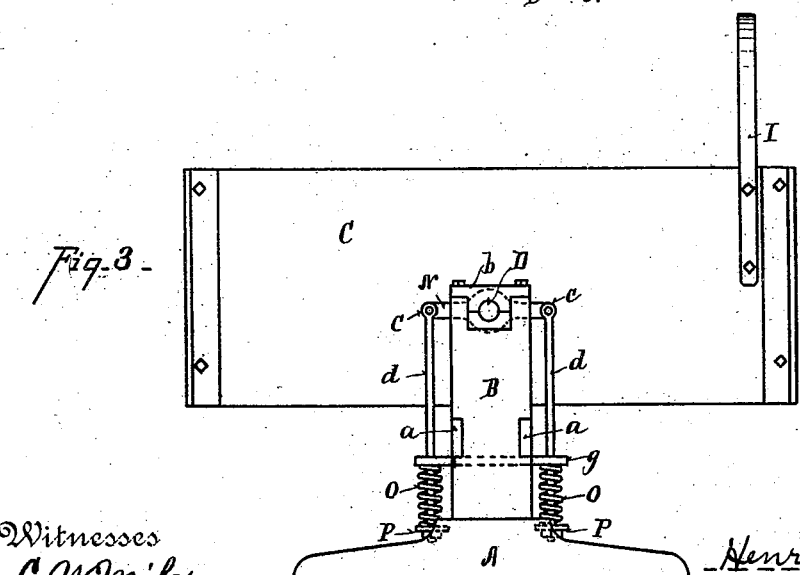

Figure 1 is a section of my improvement on line $x, x$, Fig. 2. Fig. 2 is a top plan view of the same. Fig. 3 is a side elevation of the same.

A represents the sill or base of the frame; B upright posts upon the top of which the box C is suspended.

$a, a$, represent cross rails securely attaching posts B, B, together to form a rigid frame.

D represents gudgeons journaling in bearings $b$, and rigidly attached to the box C.

$c$ represents pivots preferably secured to the bracket N, on the box so as to hold them rigidly in position.

$d$ represents rods provided with eyes journaling on the pivots $c$. O, O, represent compensating springs secured to said rods $d$.

$g$ represents a guide rigidly secured to posts B, and pierced with holes at either end through which the rods $d$ freely move, and serve as the upper seats for the springs O.

P represent nuts screwed on the lower ends of the rods $d$ for securing and adjusting the tension of the springs O, O.

I represents a lever; I have shown it of bail form, but this is immaterial, by means of which the box C is oscillated by the operator.

The interior of the churn is provided with a series of rounds G secured in the slats H and located equidistant from the axis of oscillation; these serve as break-rods to separate the cream and break it up in small sprays as it is thrown from one side to the other.

J represents the lid of the box secured by clamps K.

It will be apparent that the greater the load the greater the power engendered by the weight and force of the moving charge within the box, and consequently a greater depression upon the spring thus acted upon, and the greater the power utilized in the recoil of the spring throwing it back and assisting to move the load in the opposite direction; hence a comparatively large charge is operated upon almost as easily as a small charge, due to the use of this compensating spring.

Having described my invention, what I claim is—

1. The combination with the oscillating box, of the rods $d$ arranged on opposite sides of the axis of the box and provided with adjustable nuts P, a seat $g$, and compensating springs O interposed between the seat and the nuts on the rods, substantially as described.

2. The combination with the posts B, and the oscillating box C provided with gudgeons D, of the bracket N having pivots $c$ at opposite sides of the gudgeons, the rods $d$ engaging the pivots of the bracket, and provided with adjustable screw nuts P, the spring seat $g$ secured to one of the posts, and the compensating springs O arranged on the rods between the spring seat and the nuts, substantially as described.

In testimony whereof I have hereunto set my hand.

HENRY G. OLDS.

Witnesses:
BRUTUS A. BOURIE,
JNO. L. HANNA.